US012323440B2

(12) United States Patent
Zoldi et al.

(10) Patent No.: US 12,323,440 B2
(45) Date of Patent: *Jun. 3, 2025

(54) OVERLY OPTIMISTIC DATA PATTERNS AND LEARNED ADVERSARIAL LATENT FEATURES

(71) Applicant: FAIR ISAAC CORPORATION, Minneapolis, MN (US)

(72) Inventors: Scott Michael Zoldi, San Diego, CA (US); Shafi Ur Rahman, San Diego, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,019

(22) Filed: Oct. 11, 2023

(65) Prior Publication Data

US 2024/0039934 A1 Feb. 1, 2024

Related U.S. Application Data

(63) Continuation of application No. 17/102,295, filed on Nov. 23, 2020, now Pat. No. 11,818,147.

(51) Int. Cl.
*H04L 9/40* (2022.01)
*G06N 3/04* (2023.01)
*G06N 3/08* (2023.01)

(52) U.S. Cl.
CPC .......... *H04L 63/1416* (2013.01); *G06N 3/04* (2013.01); *G06N 3/08* (2013.01)

(58) Field of Classification Search
USPC ..................................................... 726/22–25
See application file for complete search history.

(56) References Cited

U.S. PATENT DOCUMENTS 7,813,937 B1 * 10/2010 Pathria ................... G06Q 10/10
706/15
8,027,439 B2 * 9/2011 Zoldi ..................... G06Q 40/00
379/188

(Continued)

OTHER PUBLICATIONS

Behera, T. et al. (2015). "Credit Card Fraud Detection: A Hybrid Approach Using Fuzzy Clustering & Neural Network," 2015 Second International Conference on Advances in Computing and Communication Engineering, IEEE, May 1, 2015 (May 1, 2015), pp. 494-499, XP032798717, DOI: 10.1109/ICACCE.2015.33 ISBN: 978-1-4799-1733-4 [retrieved on Oct. 23, 2015].

*Primary Examiner* — Kambiz Zand
*Assistant Examiner* — Mahabub S Ahmed
(74) *Attorney, Agent, or Firm* — Mintz, Levin, Cohn, Ferris, Glovsky and Popeo, P.C.; F. Jason Far-hadian, Esq.

(57) ABSTRACT

Systems for improving security of a computer-implemented artificial intelligence by monitoring one or more transactions received by the machine learning decision model; receiving a first score generated by the machine learning decision model in association with a first transaction; identifying the first transaction as belonging to a first class, in response to the first score being lower than a certain score threshold and the first transaction having a low occurrence likelihood; receiving a second score in association with the first transaction based on one or more adversarial latent features associated with the first transaction as detectable by an adversary detection model; and determining at least one adversarial latent transaction feature being exploited by the first transaction, in response to determining that the second score falls above the certain score threshold.

20 Claims, 8 Drawing Sheets

(56) References Cited

U.S. PATENT DOCUMENTS

| | | | |
|---|---|---|---|
| 8,805,836 B2* | 8/2014 | Hore | G06Q 30/06 |
| | | | 707/740 |
| 9,294,497 B1* | 3/2016 | Ben-Or | H04L 63/1433 |
| 9,516,053 B1* | 12/2016 | Muddu | G06F 16/9024 |
| 10,341,355 B1* | 7/2019 | Niemoller | H04L 63/104 |
| 10,460,320 B1* | 10/2019 | Cao | G06N 20/10 |
| 10,692,004 B1* | 6/2020 | Segev | G06Q 50/01 |
| 10,853,739 B2* | 12/2020 | Truong | G06N 3/045 |
| 11,102,244 B1* | 8/2021 | Jakobsson | H04L 51/42 |
| 11,252,188 B1* | 2/2022 | Lantuh | G06F 21/50 |
| 11,501,156 B2* | 11/2022 | Zhang | G06N 3/045 |
| 2008/0109730 A1* | 5/2008 | Coffman | G06Q 30/02 |
| | | | 715/733 |
| 2009/0132347 A1* | 5/2009 | Anderson | G06Q 30/02 |
| | | | 705/30 |
| 2011/0004498 A1* | 1/2011 | Readshaw | G06Q 20/24 |
| | | | 705/318 |
| 2012/0284791 A1* | 11/2012 | Miller | G06F 21/554 |
| | | | 726/22 |
| 2013/0204755 A1* | 8/2013 | Zoldi | G06Q 20/4016 |
| | | | 705/30 |
| 2014/0180974 A1* | 6/2014 | Kennel | G06Q 30/0609 |
| | | | 706/12 |
| 2014/0317736 A1* | 10/2014 | Cao | H04L 63/1483 |
| | | | 726/23 |
| 2015/0193768 A1* | 7/2015 | Douglas | G06Q 20/4016 |
| | | | 705/44 |
| 2015/0195299 A1* | 7/2015 | Zoldi | H04L 63/1408 |
| | | | 726/25 |
| 2017/0206466 A1* | 7/2017 | Zoldi | G06F 18/2132 |
| 2017/0230417 A1* | 8/2017 | Amar | H04L 63/08 |
| 2017/0270428 A1* | 9/2017 | Zoldi | G06N 20/00 |
| 2018/0053188 A1* | 2/2018 | Zoldi | G06Q 20/102 |
| 2018/0330379 A1* | 11/2018 | Zoldi | G06N 3/045 |
| 2018/0350006 A1* | 12/2018 | Agrawal | G06F 7/08 |
| 2019/0095798 A1* | 3/2019 | Baker | G06N 7/01 |
| 2019/0121978 A1* | 4/2019 | Kraemer | G06F 21/565 |
| 2019/0122258 A1* | 4/2019 | Bramberger | G06N 3/08 |
| 2019/0156196 A1* | 5/2019 | Zoldi | G06N 3/08 |
| 2019/0156206 A1* | 5/2019 | Graham | G06N 3/08 |
| 2019/0188212 A1* | 6/2019 | Miller | H04L 63/145 |
| 2019/0205762 A1* | 7/2019 | Sher | G06N 3/082 |
| 2019/0228312 A1* | 7/2019 | Andoni | G06F 18/2433 |
| 2019/0266528 A1* | 8/2019 | Cheng | G06Q 10/0635 |
| 2019/0295088 A1* | 9/2019 | Jia | G06N 5/04 |
| 2019/0311367 A1* | 10/2019 | Reddy | G06Q 20/4016 |
| 2019/0317945 A1* | 10/2019 | Ezick | G06F 16/254 |
| 2019/0325163 A1* | 10/2019 | Sharad | G06F 21/82 |
| 2019/0378050 A1* | 12/2019 | Edkin | G06N 20/20 |
| 2020/0074274 A1* | 3/2020 | Fan | G06F 17/18 |
| 2020/0076841 A1* | 3/2020 | Hajimirsadeghi | G06F 18/2136 |
| 2020/0193285 A1* | 6/2020 | Ishii | G06N 3/084 |
| 2020/0202219 A1* | 6/2020 | Song | G06N 7/01 |
| 2020/0218983 A1* | 7/2020 | Thornton | H04L 65/403 |
| 2020/0234110 A1* | 7/2020 | Singh | G06N 3/04 |
| 2020/0250304 A1* | 8/2020 | Kruus | G06N 20/00 |
| 2021/0073612 A1* | 3/2021 | Vahdat | G06N 3/084 |
| 2021/0103814 A1* | 4/2021 | Tsiligkaridis | G06N 3/08 |
| 2021/0103925 A1* | 4/2021 | Dev | G06Q 20/4015 |
| 2021/0194896 A1* | 6/2021 | Seymour | G06F 11/3072 |
| 2021/0224425 A1* | 7/2021 | Nasr-Azadani | G06N 5/04 |
| 2021/0273958 A1* | 9/2021 | McLean | H04L 63/1433 |
| 2021/0273960 A1* | 9/2021 | Humphrey | G06N 7/01 |
| 2021/0319113 A1* | 10/2021 | Cheng | G06N 3/045 |
| 2021/0352095 A1* | 11/2021 | Cam | G06N 7/01 |
| 2021/0406364 A1* | 12/2021 | Dasgupta | G06N 5/04 |
| 2022/0012741 A1* | 1/2022 | Raj | G06Q 20/405 |
| 2022/0094709 A1* | 3/2022 | Sharma | G06N 3/006 |
| 2022/0156376 A1* | 5/2022 | dos Santos Silva | G06F 21/554 |
| 2022/0156563 A1* | 5/2022 | Zhang | G06F 18/214 |
| 2022/0172050 A1* | 6/2022 | Dalli | G06N 3/047 |
| 2022/0377096 A1* | 11/2022 | Johnston | H04L 63/145 |
| 2022/0400125 A1* | 12/2022 | Mendelowitz | G06F 18/214 |
| 2024/0338491 A1* | 10/2024 | Al Faruque | G06F 21/56 |

\* cited by examiner

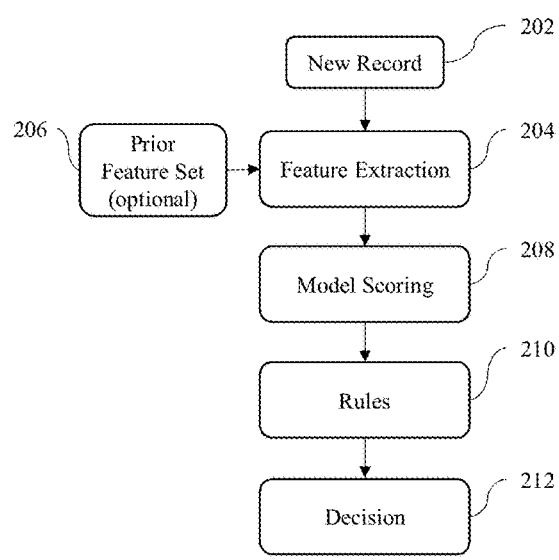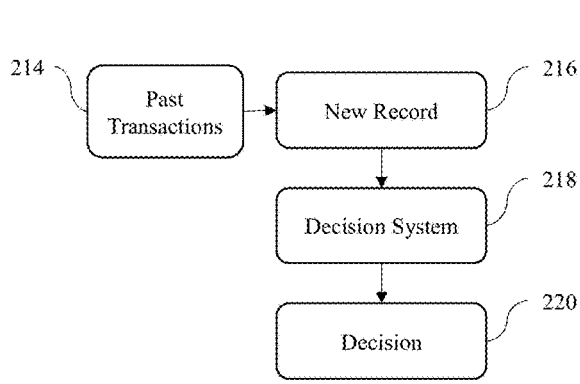
*FIG. 2A*  *FIG. 2B*

OVERLY OPTIMISTIC DATA PATTERNS AND LEARNED ADVERSARIAL LATENT FEATURES

CROSS-REFERENCE TO RELATED APPLICATION

The current patent application claims priority to and is a continuation of U.S. patent application Ser. No. 17/102,295 filed on Nov. 23, 2020 the entire content of which is hereby incorporated by reference herein.

TECHNICAL FIELD

The disclosed subject matter generally relates to artificial intelligence (AI) technology and, more particularly, to AI machine learning models and improvements that anticipate and prevent attacks on related computing systems, models and technologies.

BACKGROUND

Machine learning models are increasingly used for decision making in a variety of use cases. These models are trained on datasets collected from past experience. The model learns the underlying decision boundaries that lead to various outcomes and generates scores that reflect a probability for one or more outcomes. Such models learn relationships based on patterns in the data that may represent reality or artifacts in the collected historical data, or the signatures of the specific decisions made in data selection, as well as quality and sampling.

Certain patterns may be weak or not exist in the training data. Some models often lack sensitivity to these patterns and simply extrapolate an outcome probability based on dominant relations expressed in the training data. This lack of sensitivity to data patterns that are rare, or not seen in the training dataset, may result in model extrapolation or generalization where the newness or rareness of a data pattern in production may materially impact probability of an outcome or invalidate the use of the model. Adversarial actors search for and explore data patterns to find paths for exploiting various contiguous combinations of inputs that cause the score to not change materially or change in a preferred direction to meet planned nefarious activities.

Adversarial actors want to exploit the model to increase the total value of fraudulent transactions that can be successfully completed. They exploit these relationships by carefully adjusting combinations of variables, while ensuring that the model's score doesn't change significantly, so that the model's behavior remains in a range indicative of low risk. Depending on the way the decision model has been designed, the less risky instances could be either low scores (i.e., in case of fraud detection) or high scores (i.e., in case of predicting credit worthiness).

For example, a fraudster who can successfully steal $40.00 may find that she is blocked, if she raises the dollar amount to $50.00. As a result, she may experiment with changing one or more parameters of the transaction or adjust certain transaction features to find a way to push the model to make decisions that achieve her goal. By attempting various combinations of input parameters at scale, fraudsters are able to probe for combinations of inputs and model phase spaces that maximize the reward feature, while minimizing changes in the outcome of the model to evade detection. Improved AI systems are needed that are resistant to this kind of probing and manipulation.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems, methods and computer program products for improving security of an artificial intelligence system are provided. The system may comprise processors for monitoring one or more transactions received by a machine learning decision model and receiving a first score associated with a first transaction. The first transaction may be identified as likely adversarial, in response to the first score being lower than a certain score threshold and the first transaction having a low occurrence likelihood. A second score may be generated in association with the first transaction based on one or more adversarial latent features associated with the first transaction. At least one adversarial latent transaction feature may be detected as being exploited by the first transaction, in response to determining that the second score falls above the certain score threshold. Abnormal volumes of activations of at least one adversarial latent feature spanning across a plurality of transactions scored may be detected and blocked.

In certain embodiments, the first score may be based on transaction history and one or more features extracted from the first transaction by a feature extraction module. The first transaction may be identified as likely adversarial, in response to the first score being lower than a certain score threshold and the first transaction having a low occurrence likelihood. The first transaction may be determined as having a low occurrence likelihood based on comparing attributes of the first transaction with attributes of one or more other transactions. The first transaction may be identified as likely adversarial, in response to measuring whether the first score is lower than a certain score threshold and determining whether the first transaction has a low occurrence likelihood based on comparing the first transaction's score and attributes with one or more other transactions.

In certain embodiments, an adversary detection model may detect an abnormal volume of activations of at least one adversarial latent feature spanning across a plurality of transactions scored and block transactions that match the adversarial latent feature. The adversary detection model may be implemented based on newly labeled adversarial transactions to determine the latent features describing features relationships in an adversarial space. The one or more extracted features for the first transaction may be binned into ranges of values observed in a training dataset. Various attributes and adversarial latent features of the adversary detection model, including at least one of a neural network or a multi-layered self-calibrated model (MLSC), may be aggregated using moving averages across various transactions that score low by the decision model and high by the adversary detection model in the production system.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

Systems for improving security of a computer-implemented artificial intelligence model may include one or more processors configured to execute logic code for calculating a first score for a first transaction based on one or more features extracted from the first transaction and related transaction history. The first transaction may be determined as likely adversarial if the first score is within a first range and the first transaction has a low occurrence likelihood based on comparing attributes of the first transaction with those of one or more other transactions.

In some embodiments, a second score may be calculated in association with the first transaction based on one or more adversarial latent features detected in the first transaction, at least one adversarial latent feature being determined as exploited by the first transaction when the second score is within a second range. Transactions that match the at least one adversarial latent feature may be tagged, in response to detecting an abnormal volume of activations of the at least one adversarial latent feature spanning across a plurality of transactions scored by the adversary detection model. The tagged transactions may be blocked as adversarial.

In accordance with one or more embodiments, a machine learning training method may be implemented for generating a corpus of transactions comprising first transactions identified as likely adversarial and second transactions not identified as likely adversarial. The generating may comprise, for each transaction of a plurality of transactions, calculating a first score. The calculating may include applying a first scoring model with inputs comprising a transaction feature extracted from the transaction and a transaction history for the transaction. The first likely adversarial transactions may include those transactions having improbably low first scores within a first range and having a low occurrence likelihood based on comparing the first score and attributes of the transaction with those of one or more other transactions in the plurality of transactions.

The second transactions may be identified as those remaining transactions of the plurality of transactions that are not identified as the first transactions. An adversary detection model may be trained based on attributes of the transactions in the corpus. The adversary detection model comprises a neural network model, and the training may comprise utilizing a stochastic gradient descent learning approach which tries to minimize a cost function reflective of separation between actual tag values and predicted tag values for transactions in the corpus, a tag value being the identification of a transaction as being either likely adversarial or not.

In some embodiments, the adversary detection model comprises a multi-layered self-calibrating (MLSC) model and the training comprises determining that the corpus comprises a large number of defined possible latent features; applying a semi-supervised learning technique using the attributes of the transactions in the corpus; and identifying strength of each hidden node of the MLSC model and eliminating those hidden nodes which do not have a certain level of strength.

In certain embodiments, a computer-implemented system comprising one or more processors is provided. The processors may be configured to execute logic code to accurately and efficiently identify adversarial transactions that target vulnerabilities in artificial intelligence (AI) models. The system may include a first AI model for calculating a first score for a first transaction based on one or more features extracted from the first transaction and transaction history associated with the first transaction. The first transaction may be tagged as potentially adversarial, in response to determining that the first score is in an improbable range based on comparing first attributes associated with the first transaction with second attributes associated with at least a second transaction, the comparison indicating the first transaction has a low likelihood of occurrence.

In some embodiments, the system may comprise a second AI model for identifying adversarial transactions, in response to determining that number of plurality of example transactions scored by the first model is sufficient to train the second AI model, the second AI model being trained using a supervised learning approach based on features associated with the plurality of example transactions scored by the first AI model, the training of the second AI model being according to a stochastic gradient descent method.

In some embodiments, the system may comprise a third AI model for identifying adversarial transactions, in response to determining the number of the plurality of example transactions scored by the AI model is insufficient to train the second AI model, the MLSC model being trained using a semi-supervised learning approach in which a large corpus of possible latent features associated with adversarial transactions is defined and used to detect adversarial transactions, strength of one or more hidden nodes of the MLSC model being calculated so that the hidden nodes with strength values below a threshold are eliminated to make the MLSC model more efficient.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIG. 2A illustrates a schematic of a decision system using a decision model for business decisions, in accordance with one or more embodiments.

FIG. 2B illustrates a schematic of a decision system as seen by an adversarial actor, in accordance with one or more embodiments.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
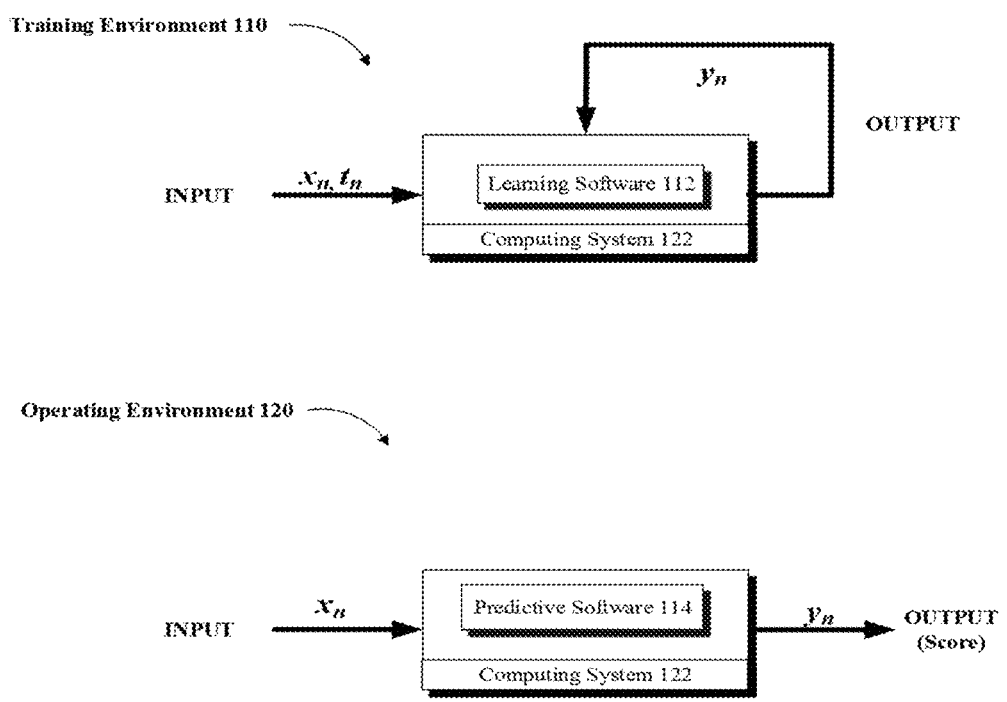
FIG. 1 illustrates a block diagram of example training and operating environments for a computer-implemented learning model, in accordance with one or more embodiments.

Referring to FIG. 1, example training environment 110 and operating environment 120 are illustrated as associated with an artificial intelligence (AI) enabled machine learning model. As shown, a computing system 122 and training data may be used to train learning software 112. Computing system 122 may be a general-purpose computer, for example, or any other suitable computing or processing platform. Learning software 112 may be a machine learning or self-learning software that receives event-related input data. In the training phase, an input event may be known as belonging to a certain category (e.g., fraudulent or non-fraudulent) such that the corresponding input data may be tagged or labeled as such.

It is noteworthy that, in some embodiments, the learning model may be fully supervised, semi-supervised or unsupervised. As such, the model may not require any training or a substantial level of training using tags or labels. Nevertheless, in accordance with one or more embodiments, learning software 112 may process the input data associated with a target event, without paying attention to the labels (i.e., blindly), and may categorize the target event according to an initial set of weights (w) and biases (b) associated with the input data. When the output is generated (i.e., when the event is classified by learning software 112), the result may be checked against the associated labels to determine how accurately learning software 112 is classifying the events.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of adjusting weights and biases associated with the input data. Through multiple iterations and adjustments, the internal state of learning software 112 may be continually updated to a point where a satisfactory predictive state is reached (i.e., when learning software 112 starts to more accurately classify the inputted events at or beyond an acceptable threshold).

In the operating environment 120, predictive software 114 may be utilized to process event data provided as input. It is noteworthy that, in the operating phase, input data is unlabeled because the classification (e.g., the fraudulent nature) of events being processed is unknown to the model. Software 114 may generate an output that classifies a target event as, for example, belonging to a first class (e.g., the fraudulent category) based on fitting the corresponding event data into the first class according to the training data received during the training phase. In accordance with example embodiments, predictive software 114 may be a trained version of learning software 112 and may be executed over computing system 122 or another suitable computing system or computing infrastructure to generate one or more scores that can be used to make determinations about an event (e.g., a fraudulent transaction), an applicant (e.g., loan approval) or other activity.

FIG. 2A is a schematic of a decision model implemented over a machine learning platform. The decision model takes a new record 202 as an input and generates a score reflecting the outcome probability for that record (for example approval/decline). A feature extraction module 204 translates the input record into a set of input features before being scored by the model scoring module 208. Feature extraction can be solely based on the input record, or it may rely additionally on a prior feature set based on the transaction history for that entity and connected to the input record either in time or in alternate data. Features based on the entity's prior feature set 206 optionally capture the entity's transaction history.

The computed features are fed into the decision model, which then generates a score based on the machine learned relationships between the input features represented within the model. A set of rules 210 may further process the score before a final decision 212 is generated. The final decisions may be binary. For example, in case of fraud detection model for credit card transaction the decision would be either to deny or approve the transaction. Similarly, for a new credit application, the decision would be either to approve or decline the application, in the area of credit risk it would be the credit score associated with a consumer.

To adversarial actors, the inner workings of the model are often not accessible unless they invest in social engineering. They may or may not be familiar with the input data used in the model, unless the model exists in the public domain with its APIs published. They are also usually not familiar with model architecture, the model parameters that define the relationships in the model driving the scores, or the business rules being applied. All they can usually observe is the decision output that is generated by the decision system for a given record input that they purport to control.

FIG. 2B illustrates a schematic decision system from the adversarial actor's perspective. Ability to score a new record through such a decision system and observe the returned decision can be exploited by sophisticated adversarial actors when utilizing adversarial AI. For instance, a fraudster interested in defrauding a payment card would like to find the right data pattern where the transaction amount (the value they can steal from the payment system and cardholder) can be increased without having the approval decision change. In that sense, they are looking to identify how other features must change to maintain a fixed decision as the reward feature (money stolen) goes up.

An adversarial AI may operate on past transactions 214 and the corresponding decisions returned in terms of whether the transactions were approved or denied. The outcomes would allow the adversary to identify the combinations which are just short of tipping the decision against them. Once such a combination is identified, they can submit multiple similar transactions on various compromised payment cards for a bust-out fraud when they have perfected how to extract the maximum amount of value from the stolen payment details. Industrious criminals will hire an army of mules or automate through orchestrated mass attack to exploit at scale before the financial institution can respond/adjust.

In the example discussed above (see FIG. 2B and related paragraphs), the adversary looks for large values of the transaction amount for the given combination of transaction parameters and past transaction histories that still lead to an approved decision 220 by way of a decision system 218 processing a new record 216. Such combinations are either rare in the training dataset or even non-existent, but the adversary knows that the model will generalize based on the training data and coverage available during model training. Industrious adversaries may even try to poison these training data sets through insider exploits and social engineering. While different architectures of the model, say Neural Network, vs. Gradient Boosted Decision Trees, may lead to this extrapolation in various ways, the adversary just needs to find the right combinations of transaction parameters and histories to exploit the decision system. To do this, the adversary will employ machine learning and AI systems to collect data to sufficiently explore the behaviors of the model and model weaknesses to evade detection.

A sophisticated adversary may collect all the available transaction histories ending in transactions with desired high values of reward feature. They may utilize approvals and declines of these probing transactions as binary tags. They may even create transaction features based on the available transaction histories and build a simple adversarial model which allows them to predict the combination of features that counteract high transaction amounts which could have led to an unfavorable decision.

Figure 3:
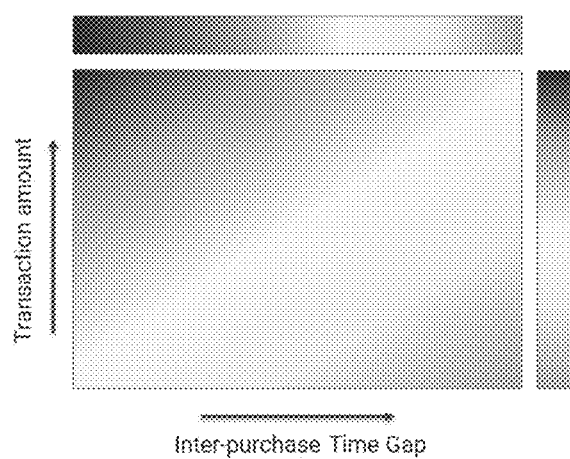
FIG. 3 illustrates an example of a projection of a two-dimensional manifold in a decision phase space shown as a heat-map demonstrating counteracting relationship between transaction amount and inter-purchase time gap, in accordance with one or more embodiments.

FIG. 3 shows an example of a projection of a two-dimensional manifold in the decision phase space based on the transaction history as a heat-map (top left being the hottest, bottom right being the coolest), where the increasing transaction amount is counterbalanced by the time between transactions to yield a constant score in a payment card fraud scenario. As transaction amount increases, the score goes up. As inter-purchase time gap increases, the score goes down. But for combination of values of these two profile variables, the values can be chosen such that score remains constant across the diagonal going from bottom left corner to the top right corner allowing one to increase dollar amount by increasing time between transaction keeping risk fixed.

In this simple example, one can steal more money by allowing more time between transactions to maintain the same model score, and typically the same approve/decline decision. It is worth noting that this scenario can arise due to feature interaction in computing the score. It is also worth noting that many model developers may not keep adversarial attacks in mind as they design their models and AI applications, and be unaware of these backdoors.

In accordance with some embodiments, a method which can identify transactions that are adversarial in nature is disclosed. Having access to the components of a decision model provides complete knowledge of all the transaction features generated through the feature extraction process and utilized in the model as input variables. The input variables may be generated and understood probabilistically when the score associated with the value attribute is uncharacteristically low based on the corpus of examples and consequently tag those cases as adversarial. Synthetic data not seen in model training which violate the norm of distribution of scores can be generated to highlight those that are too low so we can build an anti-adversarial model that determines the combinations of features, transaction histories, and latent features that will be manipulated by adversarial models in the field.

Armed with the features and corresponding scores for historical transactions, a defensive task may identify those features which drive the score towards a less risky range. In some aspects, depending on the way the decision model has been designed, the less risky instances may be either low scores (i.e., in case of fraud detection) or high scores (i.e., in case of predicting credit worthiness). For example, in the case of fraud detection, the dollar amount would naturally make the score more risky and raise the score. We want to identify counter-balancing effects of different variable combinations. In one embodiment, those combinations of behavior that lead to less risky scores may be determined. We call such combinations of behavior as adversarial latent features.

In certain embodiments, a mechanism may be configured to compute the likelihood of values of the reward feature yielding a low score based on the corpus of all historical data. The transaction history may be isolated in either the training data or synthetic data, which has the highest likelihood of generating abnormal low scores. As an example, in the fraud area, the probability of observing a $1,000 transaction scoring a low fraud score of 10 may be 0.01%, when fraud scores range from 1 (least risky) to 999 (most risky). From these identified abnormally low probability occurrences, a defensive model may be implemented as provided in further detail below. Further, the density of rare adversarial transaction patterns in production data may be monitored to identify higher densities that may indicate a concerted effort by a coalition of adversaries working as a network to exploit the adversarial attack before the financial institutions can react.

To understand the probability of rareness of different transactions, a Bayesian table may be built. Using Bayes' theorem the probability for a hypothesis may be updated as more evidence or information becomes available to dynamically analyze a sequence of data. In one embodiment, a transaction feature, including the reward feature, is binned into ranges of values observed in the training dataset. Thus, a feature f is binned in ranges, $f_i$, indexed by i. Corresponding to a binned value of the feature, $f_i$, a probability distribution of scores may be attached.

For example, the reward feature "transaction amount" may be binned into ranges of values. Consider one such bin to be ranged between $1000-$1100. For each such bin, the score distribution probability density function may be computed. For a given feature, f, the likelihood of observing the given score Sj for its observed value being in the feature bin i, is given by a score distribution probability density function, such as that provided below where $C_{ij}$ is the count of observations of the score bin j and feature bin i.

$$P(j \mid i) = P(\text{score} = S_j \mid f \in f_i) = \frac{C_{ij}}{\sum_j C_{ij} + \varepsilon} \qquad (1)$$

The result provides the probability of score being Sj, given the value of the transaction feature f being in bin i. A small value, represented by E is added to the denominator to make sure that if a particular feature bin has no coverage across the score spectrum, the conditional probability is zero. Alternative mechanisms to represent score probability density function derived from observed data can be employed.

An adversarial situation may arise when a transaction is assigned an improbably low score by the model based on the totality of features and transactions. If F represents the set of transaction features, then for each of the transaction features, $f \in F$, including the reward feature, conditional probability of observing the score is evaluated using equation (1). Based on the conditional probabilities, one can infer that the transaction lies in an adversarial region, as indicated in FIG. 3.

For tagging transactions as adversarial, we compute the likelihood, L, of the transaction, $T_k$, having the observed score $S_k$ where the observed values of each of the features $f \in F$ belong to corresponding feature bins $f_k$. Note that unlike in equation (1) where we built the Bayesian tables, our annotation here uses index k to indicate transaction specific score and feature bins. This allows us to identify those low probability transactions in the area of interest, that are indicative of adversarial outcomes—typically lower the likelihood, $L(T_k)$, the more likely the transaction being labeled as an adversarial instance.

$$L(T_k) = \min_{f \in F}(P(\text{score} = S_k \mid f \in f_k)) \qquad (2)$$

The dataset on which the original scoring model has been trained may be examined. Either this training dataset is directly utilized or an out-of-time sample is used. Given that the observed records may not represent the entire gamut of possible scenarios, and further that any such dataset will have very few adversarial examples, data enrichment may be done using a synthetic dataset generation process. While any of the multitude of synthetic dataset generation processes can be applied, any such process ideally must ensure that the synthetic dataset has similar univariate and multivariate distributions as the original training dataset. The enriched dataset is a combination of the training dataset or its equivalent sample and the synthetic dataset. We then score the enriched dataset using the scoring model and generate the likelihood value, L for all the transactions in this dataset using equation (2).

Based on the likelihood value, L we then choose a threshold to tag a transaction as adversarial, based on the L value falling below this threshold. All transactions falling below the chosen threshold are assigned a tag of 1 to represent them as being possible adversarial attack paths. Next, we take the data set now with each transaction tagged as adversarial or not and find the adversarial latent features that could be utilized in attack. We use the tags generated in the previous step to learn the patterns in the data that are potential adversarial attacks. We fit a model to learn the latent relationships in the adversarial data. Such a model is called an adversary detection model.

If there are a sufficient proportion of adversarial instances with tag value of 1, we fit a neural network model. Alternatively, if adversarial examples are rare, which can be the case for well-designed models, or the threshold on likelihood value, L being set very low, we end up with an insufficient set of adversarial instances, leading to class imbalance and inapplicability of traditional supervised models. In such cases, a semi-supervised model, like a multi-layered self-calibrated model (MLSC) is trained instead.

The input features of the adversarial detection model need not be the same as the input features of the scoring model. In one aspect, emphasis may be on designing the architecture such that the latent features that are learned in this model are specifically different from those in the scoring model. In fact, using features which are not necessarily the same as the scoring model allow us to explore alternate characteristics which might be driving the adversarial relationships in the scoring model.

To build an MLSC model, a set of features are selected. Each of the feature, f can then be scaled using a z-scaling process to normalize the inputs, where, $\bar{f}$ is the mean value of feature f, across the entire dataset and $f_\sigma$ is the standard deviation of feature f.

$$\hat{f} = \frac{f - \bar{f}}{f_\sigma} \qquad (3)$$

After this transformation, the features are grouped together based on similarity of the information they provide. This grouping is called a factor group. Often the factor groups can be created based on mutual information. Alternatively, Principal Component Analysis is used to identify the factor groups. In some cases, even expert knowledge may be utilized to generate the factor groups.

Our goal is to identify the adversarial latent features that drive the adversarial instances. These are the relationships that are formed by the input features of the adversary detection model and are represented as hidden nodes in neural network or MLSC architectures. As such, it is important that the hidden nodes of either of the two architectures are as sparse as possible. In the case of neural network models, this is achieved using Lasso regularization. In the case of MLSC, this is achieved by ensuring that no more than one feature is selected from each factor group as input to a hidden node. As a consequence, a hidden node may have 0 or 1 input from each factor group. Based on empirical evidence, it is possible to generate a large number of hidden nodes with very few incoming connections which can be then be explored to identify the latent features that are more often exploited as adversarial latent features.

Figure 4:
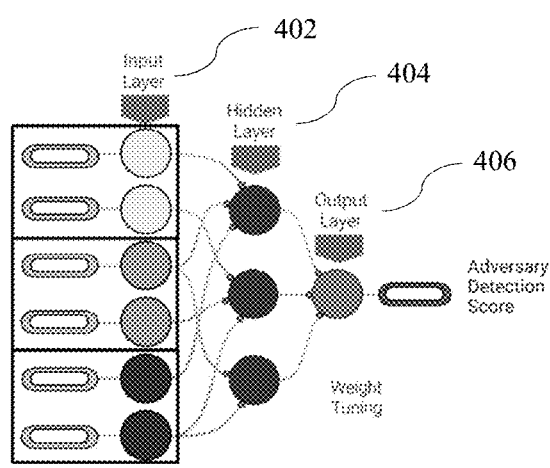
FIG. 4 illustrates a multi-layered self-calibrated model (MLSC) architecture where various z-scaled input features are grouped together in various factor groups indicated by different colors, in accordance with one or more embodiments.

An MLSC model's architecture is shown in FIG. 4 where various z-scaled input features are grouped together in various factor groups indicated by different colors. The hidden nodes representing a space of latent features are shown to have no more than one feature from each factor group as input. The hidden nodes are then connected to the output node to generate a final score.

As the various transactions are scored through this MLSC model, the activation of each of the hidden nodes is observed and aggregated. Let the activation of each of the hidden node, $h_k$, for a given transaction, T, be given by $h_k(T)$. The strength of a hidden node is then given by equation (4), where, N is the number of transactions:

$$\text{Strength} = \frac{\sum_T h_k(T)}{N} \qquad (4)$$

Based on this measure of strength, we can identify which of these hidden nodes fire up in cases of adversarial examples, i.e., (T|tag=1), by computing the strength only for the subset of transactions that are adversarial examples. This can be contrasted with their strength for non-adversarial examples (T|tag=0). This gives us the strength of the hidden nodes as the discrimination between transactions marked adversarial vs. non-adversarial as follows:

$$\text{strength} = \frac{\frac{\sum_{T|tag=1} h_k(T)}{N_1}}{\frac{\sum_{T|tag=0} h_k(T)}{N_0}} - 1$$

Thus upon rearranging terms we get, $$\text{strength} = \frac{\sum_{T|tag=1} h_k(T)}{\sum_{T|tag=0} h_k(T)} \frac{N_0}{N_1} - 1 \quad (5)$$

$N_1$ is the number of transactions with tag of 1 and $N_0$ is the number of transactions with tag of 0. The strength of a hidden node that randomly fires for both types of cases is then 0. We are interested in the cases with positive strength as they are better at detecting adversarial than random.

The strength is then utilized to fine-tune the weights of the edges connecting the hidden nodes to the output node. We begin with uniform contribution of all inputs to each hidden node. Alternatively, we can train to change the weights on the input layer but after having set up the architecture using the MLSC method. The hidden nodes with positive strength values are preferred over others as they are good at detecting adversarial instances. Thus, we zero out all the other hidden nodes and only retain the hidden nodes which have positive strength.

FIG. 4 illustrates multi-layer self-calibrating model to capture the patterns of features which can detect adversarial examples. The nodes with zero or negative strength are not effective at identifying adversarial instances and hence are zeroed out from the model, and only hidden nodes with positive strength values are retained.

The adversary detection model, either as a neural network model, or as an MLSC model, thus translates the Bayesian conditional probability distributions into an easy to implement structure that has learned the nonlinear relationships in the data, expressed them as adversarial latent features and translates that into a score that indicates the likelihood of a transaction being adversarial. Once deployed in the production environment in conjunction with the scoring model, the adversary detection model generates a score for each transaction to indicate likelihood of being an adversarial transaction. This adversary detection score is the first gatekeeper needed to identify a potential adversarial attack. The higher the adversary detection score is for an incoming transaction with a low decision model score, the more likely it is that the transaction is an adversarial attack.

For detection of an adversary attack while ensuring low false positive rates, we leverage the corresponding adversarial latent features of possible adversarial transactions. Adversarial scenarios are hard to discover for an adversary. As such, when such a scenario is detected, the adversary tries to maximize their gain by transacting as many cases as possible in as short a time as possible before their transactions are shut down. The adversarial latent relationship in such adversarial transactions are representative of the scenario that the adversary has detected. As such, there are two unique aspects of an adversarial attack that can be leveraged for detection of attack.

In some embodiments, the moving averages of adversarial transactions over various periods of time may be monitored. Transactions with adversary detection scores above a threshold are treated as adversarial transactions. We also monitor moving averages of adversarial transactions by various indicator variables related to the transaction over various periods of time. The indicator variables include merchant category code (MCC) of the transaction, merchant code, country of transaction, etc. For example, we compute the number of adversarial transactions to Kazakhstan over 1 hour and 1 week, and then keep track of the ratio of these two measures to yield one such ratio variable. These adversarial transaction measures are one type of measures whose ratio we monitor.

When an adversarial transaction is scored using the adversary detection model, the hidden node(s) representing the latent relationship corresponding to the adversarial scenario are active. Since the underlying scenarios for the burst of adversarial transactions are likely the same, when we observe a burst of adversarial transactions, the hidden nodes that fire up are likely to remain the same across all these transactions. Thus, we monitor the various hidden nodes that are active for adversarial transactions. If they remain same, while the system features are in outlier ranges, the transactions are more likely to be true adversarial transactions.

We similarly monitor the top adversarial latent feature activations and how they shift over time. These shifts over time are defined as ratios of observances over different time scales using moving average, such as activations of adversarial latent feature 7 in the last 5 minutes compared to in the last 24 hours. Spikes in the values of these ratios indicate a particular adversarial latent feature being exploited. We also monitor the activation of the adversarial latent features by merchant, country, and MCC levels or other indicator variables to look for specific attack trajectories, for example, associated with a set of adversarial latent features being exploited to move money to Kazakhstan.

Figure 5:
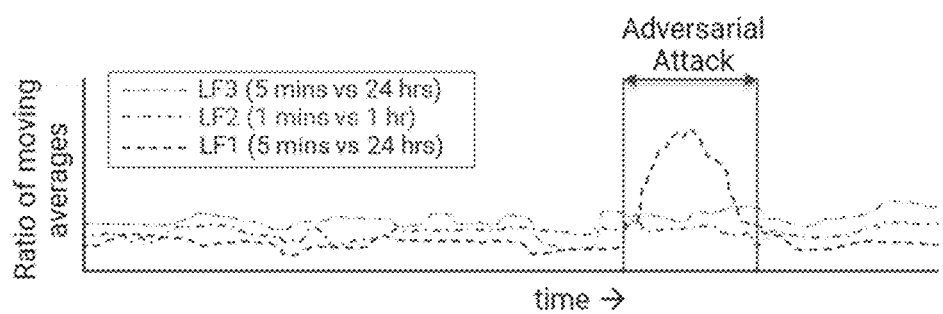
FIG. 5 illustrates a schematic representation of the ratios of moving averages of activation values of three latent features over a period of time, in accordance with one or more embodiments.

Referring to FIG. 5, the ratios of moving averages of activation values of three latent features over a period of time are illustrated. LF1, LF2 and LF3 are three named adversarial latent features of the adversary detection model. While in normal circumstances they are all roughly uniformly distributed, any spike in the activation value of even one latent feature during a short period of time is indicative of an adversarial attack unfolding in real time which is exploiting the corresponding learned adversarial latent relationships. The averages of activations of the latent features over various periods of time, whose ratios we measure, are the second set of adversarial transaction measures. These adversarial latent features represent a space of possible adversarial attacks. When activations are detected, the corresponding AI blocks transactions that are specifically activating those latent features, particularly during a spike in activity associated with adversarial attacks.

In certain embodiments, it is not uncommon to have dozens, even hundreds of ratios of moving averages of various measures. Thus, we end up maintaining a vector of ratios of moving averages of various adversarial transaction measures. Each of the components of this vector has the potential to indicate whether the system being monitored is under an adversarial attack or not.

Figure 6:
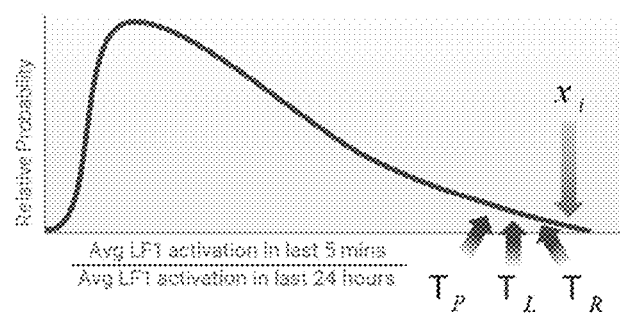
FIG. 6 illustrates a probability density distribution of the ratio of moving averages of an adversarial transaction measure used for quantile estimation, in accordance with one or more embodiments.

Moving average ratios, $x_i$, may be transformed through a quantile estimation process for outlier detection. A probability density distribution of the feature is utilized as shown in FIG. 6. Quantile estimation feature, q, of a moving average ratio variable, $s_i$, is then given as follows:

$$q_i = q(x_i \mid t) = \min\left(\max\left(\frac{s_i - T_P}{T_R - T_L}, 0\right), C\right) \in [0, C] \quad (6)$$

where, $T_P$, $T_L$ and $T_R \in t$, are various percentile thresholds with $T_P < T_L < T_R$ as shown in FIG. 6 and t is used to refer to this set of thresholds.

FIG. 6 illustrates a chart showing the relative probability density distribution of the moving averages of an adversarial transaction measure used for quantile estimation. The measures are activation of one of the adversarial latent features, named LF1, over last 5 minutes and last 24 hours. FIG. 6 also shows various quantile thresholds utilized for the quantile estimation. The $q_i$ values greater than 0 are indicative of outlier.

If we notice quantile values>0 for one or more of these moving average ratios, it is indicative of an outlier density of adversarial transactions being observed in a short period of time. This identifies a burst of adversarial transactions. In general, we are trying to understand how the high adversarial score instances occur in short bursts. Thus, the quantile estimates of the ratios of moving averages of adversarial transaction measures over various periods of time allow us to flag unusual occurrence of adversarial events in both size and volume. These quantile estimates are summed together to arrive at a self-calibrating outlier detection model, which generates a system level score, with high scores indicative of the system being under a concerted adversarial attack. This self-calibrating score is computed as follows, where t is the threshold set described earlier—it is not uncommon to set the weights, $w_i$, to 1:

$$\text{Score} = \Sigma w_i q(x_i \mid t) \quad (7)$$

Quantile estimation feature, $q_i$, may be computed for every adversarial latent feature and we monitor these for anomalies using this self-calibrating model. When it generates a score above a threshold, we can also identify the top reasons by way of the largest $q_i$s.

$$\text{Top reasons} = \text{TopN}(\text{sort}_i(w_i q_i)) \quad (8.a)$$

where, TopN(.) returns top N values from a sorted list, and sort(.) returns a sorted list of the entries based on their values from high to low.

We can also associate percentage of contribution of each as follows:

$$\% \text{ contribution of } q_i = \frac{w_i q_i}{\sum_i w_i q_i} * 100 \quad (8.b)$$

Note that here the denominator is same as equation (7).

In another implementation, a self-calibrating outlier detection model may be implemented for monitoring the measures based on the adversarial latent features. In such an implementation, outliers based on the adversarial latent features are identified. When the score exceeds a threshold, latent features that are being exploited are analyzed and based on the reasons specified by equations (8.a) and (8.b), respectively. When this model scores above a threshold, various other adversarial transaction measures are brought in based on indicators such as country, MCC and merchant. This allows us to look at how the score is affected by these indicators. This information can be utilized to understand where the attack is occurring in terms of the indicators such as MCC, merchant, country, time of day, etc.

The above process allows for reducing the flagging of a transaction with a high score generated by the adversary detection model, if it is a one-off case, as against another scenario where an adversarial actor is mounting an attack. Further, the process allows us to take defensive action as a precaution against potential adversarial attack associated with the input instance in the context of what is happening overall. The ability to identify the reason codes driving the adversarial attacks, including the adversarial latent features or one or more of the indicators, allows us to shut down the transactions with similar characteristics. For instance, if latent feature, LF1, as shown in FIG. 5, is the reason for driving the score based on equation (8.a), then subsequent transactions with high activation of LF1 can be denied. Similarly if the reason is associated with the ratio of the number of adversarial transactions to Kazakhstan over 1 hour and 1 week, then subsequent transactions associated with Kazakhstan are not approved and can be put into a case management system for further expert adjudication. This stops the adversarial AI attack by detecting the attack vector and allowing the AI to block transactions associated with likely attack, regardless if their original programing would allow them to be approved.

Figure 7:
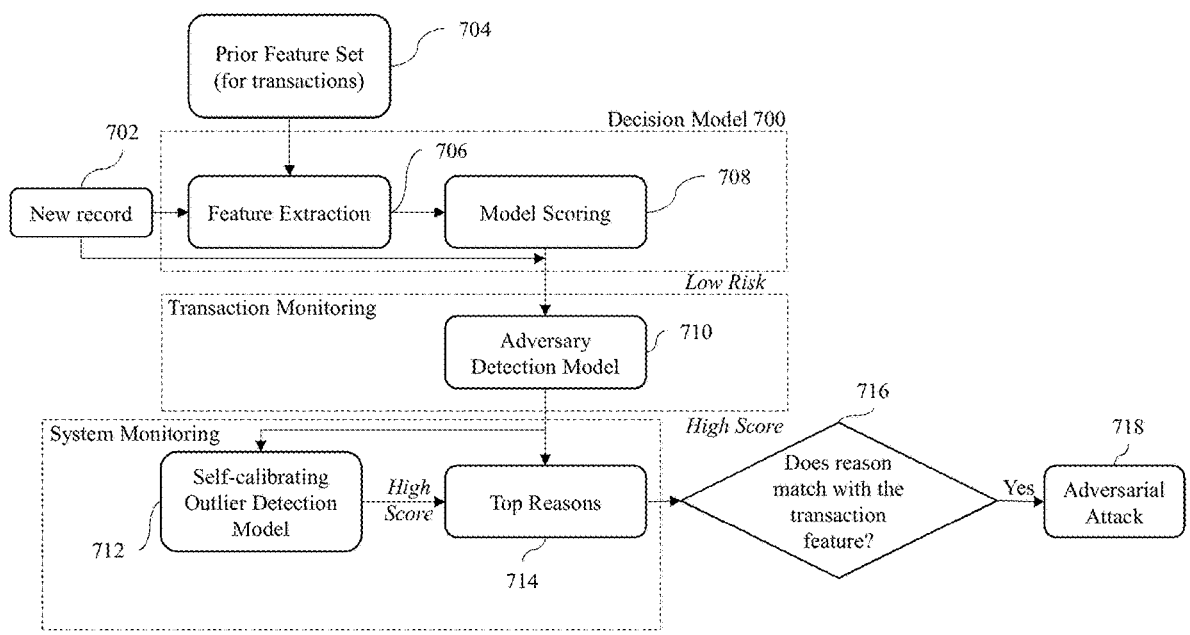
FIG. 7 illustrates a flow diagram of a process to detect and stop adversarial attacks, in accordance with one or more embodiments.

FIG. 7 illustrates an example flow diagram of a process to detect and stop adversarial attacks. A shown, a decision model 700 may be implemented as part of a computing system such as a decision software. The decision model 700 takes a new record 702 as an input and generates a score reflecting the outcome probability for that record (for example approval/decline). A feature extraction process 706 translates the input record into a set of input features before being scored by the model scoring module 708. Feature extraction can be solely based on the input record, or it may rely additionally on a prior feature set based on the transaction history for that entity and connected to the input record either in time or in alternate data. Features based on the entity's prior feature set 704 optionally capture the entity's transaction history for which the model is used to process transactions.

When a low risk transaction, as scored by the decision model 700, scores high by our adversarial detection model 710 and the self-calibrating outlier detection model 712 shows a high score indicative of unusual burst of high adversarial score instances in a short period of time, that transaction can be stopped from completing, if its adversarial transaction measure matches one of the top reasons 714 of the self-calibrating outlier detection model. In other words, if at least one or more transaction features match one or more of the top reasons (716), then the transaction is tagged as an adversarial attack (718). Doing this for all such transactions will thwart an adversarial attack.

Adversarial attacks of decisions systems are increasingly common. Our method and system described here provides a reliable and unique solution that can detect adversarial attack on a decision system, and allows it to shut down the adversarial attack quickly. Further, it generates the reasons and explanations so that additional defensive measures can be taken, such as identifying the specific behavior pattern as reflected by the adversarial latent feature that happens to be among the top reasons. This not only allows for immediately redressing the attack and deploying tactical corrective measures, but also provides valuable input to the strengthening of the decision system when they are retuned or rebuilt by exposing the weakness of the model.

We have proposed a method and a system to identify adversarial attacks being mounted on a decision system. We begin by looking at scores generated by the decision system on a representative dataset in conjunction with the values of the various variables associated with the record being scored. In some cases, the record represents a single snapshot of information, such as in credit risk, and in other cases, it represents a summarization of the history of behavior pattern, such as in payment card fraud detection. This association of input and output data allows us to build a Bayesian table, tabulating the score probability density function for various ranges of values (called bins) of the various variables, as indicated by equation (1). Using this Bayesian table, we can then capture the likelihood, L, of a particular transaction (or record) scoring favorably (i.e., high for credit risk scoring, or low for payment card fraud detection) using equation (2). This can be done on the original training dataset or another representative dataset, and can be augmented using a synthetic dataset. Based on the likelihood value L, a tag is associated with each transaction (or record) indicative of being an adversarial case, where 1 means adversarial and 0 means not adversarial.

If there are sufficient adversarial cases then a supervised neural network model is trained, otherwise a semi-supervised multi-layered self-calibrating (MLSC) model is trained to be used as the adversary detection model. Before doing so, data is normalized as per equation (3). For an MLSC model, the hidden nodes, called adversarial latent features, can be pruned based on their activation strength given by equation (5) with only those with positive strength values retained. Quantile estimation of ratios of moving averages of various adversarial transaction measures are performed as per equation (6). The adversarial transaction measures include the activation of the adversarial latent features for all transactions (or records) and values of various measures of transactions with high adversary detection scores, and further nuanced by various indicators variables relevant to the business problem, e.g., MCC, merchant and country in case of fraud detection. These quantile estimation features are used to generate a self-calibrating outlier detection model as per equation (7). When it generates a high score, it implies that the system is under an adversarial attack. The reasons and contributions to the score can be identified using equations (8.a) and (8.b). The reasons can be used to stop transactions with high adversary detection scores with features corresponding to the reasons.

Figure 8:
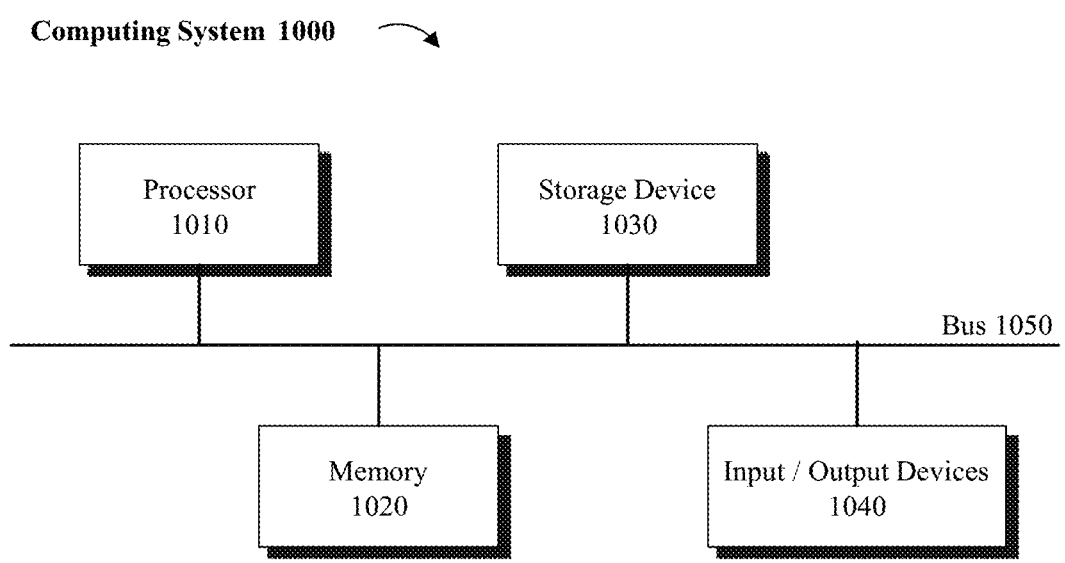
FIG. 8 is a block diagram of an example computing system that may be utilized to perform one or more computing operations or processes as consistent with one or more disclosed features.

Referring to FIG. 8, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 8, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.). In certain use cases, the computing system 1000 is a decision model.

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material which is subject to copyright protection. The applicant has no objection to reproduction by the United States Patent and Office but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented artificial intelligence system comprising a machine learning decision model, wherein security of the artificial intelligence system is improved by operations performed by one or more microprocessors, the operations comprising:

monitoring one or more transactions received by the machine learning decision model;

receiving a first score generated by the machine learning decision model in association with a first transaction;

identifying the first transaction as belonging to a first class, in response to the first score being lower than a certain score threshold and the first transaction having a low occurrence likelihood;

receiving a second score in association with the first transaction based on one or more adversarial latent features associated with the first transaction as detectable by an adversary detection model;

determining at least one adversarial latent transaction feature being exploited by the first transaction, in response to determining that the second score falls above the certain score threshold;

detecting a first volume of activations of the at least one adversarial latent feature spanning across a plurality of transactions scored by the adversary detection model;

blocking transactions, received by the machine learning decision model, that match the at least one adversarial latent feature;

aggregating a plurality of attributes and adversarial latent features of the adversary detection model using a plurality of moving average features across various transactions, a moving average feature from among the moving average features going through a quantile estimation process, wherein the moving average feature goes through the quantile estimation process using an equation as follows:

$$q_i = q(x_i \mid t) = \min\left(\max\left(\frac{s_i - T_p}{T_R - T_L}, 0\right), C\right) \in [0, C];$$

and generating one or more top reasons, in response to a system level score going above a threshold.

2. The system of claim 1, wherein the first score is based on one or more features extracted from the first transaction, by a feature extraction module, and related transaction history.

3. The system of claim 2, wherein the first transaction is determined to have a low occurrence likelihood based on comparing attributes of the first transaction with attributes of one or more other transactions.

4. The system of claim 3, wherein the adversary detection model is implemented based on newly labeled adversarial transactions during the training phase to determine the latent features describing features relationships in an adversarial space, and the one or more extracted features for a second transaction in a training dataset are binned into ranges of values observed in the training dataset.

5. The system of claim 4, wherein a feature f is binned in ranges, $f_i$ indexed by i, such that a probability distribution of scores is attached to a binned value of the feature, $f_i$, and a calculated score distribution probability density function for the feature f is calculated based on a likelihood of observing a given score Sj for its observed value being in the feature bin i, given by score distribution probability density function:

$$P(j \mid i) = P(\text{score} = S_j \mid f \in f_i) = \frac{C_{ij}}{\sum_j C_{ij} + \varepsilon} \quad (1)$$

where $C_{ij}$ is a count of observations of the score bin j and feature bin i, and $\varepsilon$ is a value added to the denominator to determine whether distribution probability should be zero.

6. The system of claim 5, wherein in response to determining that the second transaction is assigned an improbably low score $S_k$ by the decision model, considering a totality of features and transactions, a likelihood $\mathcal{L}$ for the first transaction $T_k$ is computed, $T_k$ having an observed score $S_k$ such that observed values of at least one of the features $f \in F$ belong to corresponding feature bins $f_k$ according to:

$$\mathcal{L}(T_k) = \min_{f \in F}(P(\text{score} = S_k \mid f \in f_k)) \quad (2).$$

7. The system of claim 6, wherein based on equation (2) a transaction in a training dataset is assigned a tag which indicates whether the tagged transaction is associated with a likely adversarial attack path or not.

8. The system of claim 7, wherein in response to determining that an insufficient number of transactions are tagged, a multi-layered self-calibrated (MLSC) model is utilized, the MLSC having a set of features, at least one feature f being scaled using a z-scaling process to normalize inputs according to:

$$\hat{f} = \frac{f - \bar{f}}{f_\sigma} \quad (3)$$

where, $\bar{f}$ is the mean value of feature f, across the entire dataset and $f_\sigma$ is the standard deviation of feature f.

9. The system of claim 7, wherein the features are grouped together into a factor group based on at least one of: similarity of information, principal component analysis, or expert knowledge.

10. The system of claim 9, wherein as various transactions of the training dataset are scored through the MLSC model, the activation of one or more hidden nodes in the MLSC model is observed and aggregated, such that the activation of a hidden node, $h_k$, for a given transaction, T, is given by $h_k(T)$ and the strength of a hidden node is then given by equation by $$\text{Strength} = \frac{\sum_T h_k(T)}{N} \quad (4)$$

where, N is the number of transactions.

11. The system of claim 10, wherein the strength is computed for a subset of features that are adversarial latent features and based on measuring value of the strength, hidden nodes with positive strength are identified and remaining hidden nodes are discarded.

12. The system of claim 8, wherein in response to determining that a sufficient number of transactions are tagged, a neural network model is utilized, the neural network having a set of features, at least one feature f being scaled using a z-scaling process as per equation (3) above, and wherein sparsity constraints are applied on the neural network to simplify the hidden nodes that represent the adversarial latent features.

13. The system of claim 1, wherein various attributes and the adversarial latent features of the adversary detection model, including at least one of a neural network or a MLSC, are aggregated using the moving averages across various transactions that score low by the decision model and high by the adversary detection model in the production system.

14. The system of claim 13, wherein a self-calibrating outlier detection model is implemented using quantile estimation features to generate a system level self-calibrating score as follows:

$$\text{Score} = \Sigma w_i q(x_i \mid t) \quad (7)$$

and wherein the one or more top reasons are generated, in response to the system level score going above a threshold, as follows:

$$\text{Top reasons} = \text{Top}N(\text{sort}_i(w_i q_i)). \quad (8.a)$$

15. The system of claim 14, wherein for adversarial system level scores above a threshold, an abnormal volume of an adversarial latent feature between short and medium or long time scales identifies an adversarial attack and the latent feature attack vector and wherein transactions corresponding to high adversarial scores and shared latent feature attack vector are blocked for additional decision rules and review.

16. The system of claim 15, wherein when a transaction scores low by the decision model and high by the adversary detection model, followed by a high system level score by a self-calibrating outlier detection model, if the transaction's attributes and adversarial latent features match a system level top attribute and adversarial latent features as given by equation (8.a), then the transaction is stopped.

17. A method for improving security of a computer-implemented artificial intelligence system, the method comprising:
monitoring one or more transactions received by the machine learning decision model;
receiving a first score generated by the machine learning decision model in association with a first transaction;
identifying the first transaction as belonging to a first class, in response to the first score being lower than a certain score threshold and the first transaction having a low occurrence likelihood;
receiving a second score in association with the first transaction based on one or more adversarial latent features associated with the first transaction as detectable by an adversary detection model;
determining at least one adversarial latent transaction feature being exploited by the first transaction, in response to determining that the second score falls above the certain score threshold;
detecting a first volume of activations of the at least one adversarial latent feature spanning across a plurality of transactions scored by the adversary detection model;
blocking transactions, received by the machine learning decision model, that match the at least one adversarial latent feature;
aggregating a plurality of attributes and adversarial latent features of the adversary detection model using a plurality of moving average features across various transactions, a moving average feature from among the moving average features going through a quantile estimation process,
wherein the moving average feature goes through the quantile estimation process using an equation as follows:

$$q_i = q(x_i \mid t) = \min\left(\max\left(\frac{s_i - T_P}{T_R - T_L}, 0\right), C\right) \in [0, C];$$

generating one or more top reasons, in response to a system level score going above a threshold.

18. A computer program product comprising a non-transitory machine-readable medium storing instructions that, when executed by at least one programmable microprocessor, cause the at least one programmable microprocessor to perform operations comprising:
generating a corpus of transactions comprising first transactions identified as likely adversarial and second transactions not identified as likely adversarial, the generating comprising, for at least one transaction of a plurality of transactions:
calculating a first score, the calculating comprising applying a first scoring model with inputs comprising a transaction feature extracted from the transaction and a transaction history for the transaction;
identifying as the first likely adversarial transactions those transactions having improbably low first scores within a first range and having a low occurrence likelihood based on comparing the first score and attributes of the transaction with those of one or more other transactions in the plurality of transactions;
identifying the second transactions as those remaining transactions of the plurality of transactions that are not identified as the first transactions; and
training an adversary detection model based on attributes of the transactions in the corpus, wherein a plurality of attributes and adversarial latent features of the adversary detection model are aggregated using a plurality of moving average features across various transactions, a moving average feature from among the moving average features going through a quantile estimation process,
wherein the moving average feature goes through the quantile estimation process using an equation as follows:

$$q_i = q(x_i \mid t) = \min\left(\max\left(\frac{s_i - T_P}{T_R - T_L}, 0\right), C\right) \in [0, C].$$

19. The computer program product of claim 18, wherein the adversary detection model comprises a neural network model, and wherein the training comprises:
utilizing a stochastic gradient descent learning approach which tries to minimize a cost function reflective of separation between actual tag values and predicted tag values for transactions in the corpus, a tag value being the identification of a transaction as being either likely adversarial or not.

20. The computer program product of claim 18, wherein the adversary detection model comprises a multi-layered self-calibrating (MLSC) model and wherein the training comprises:
determining that the corpus comprises a large number of defined possible latent features;
applying a semi-supervised learning technique using the attributes of the transactions in the corpus; and
identifying strength of each hidden node of the MLSC model and eliminating those hidden nodes which do not have a certain level of strength.

* * * * *